Sept. 11, 1956 B. O. QUINN 2,762,923
PULSE FREQUENCY DIVIDER
Filed Aug. 6, 1953
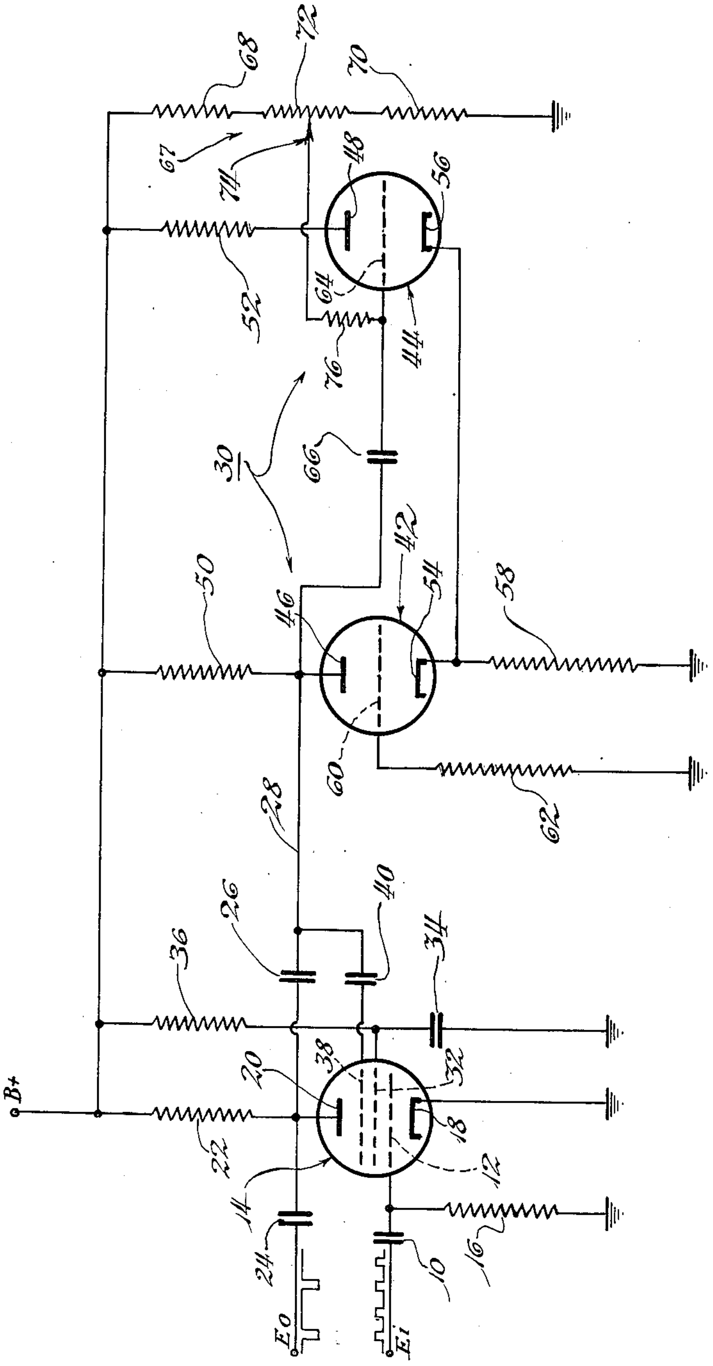
Inventor:
Bernard O. Quinn
By Ahlberg, Wupper & Gradolph
Attorneys.

United States Patent Office 2,762,923

Patented Sept. 11, 1956

2,762,923

PULSE FREQUENCY DIVIDER

Bernard O. Quinn, Chicago, Ill., assignor to Stewart-Warner Corporation, Chicago, Ill., a corporation of Virginia Application August 6, 1953, Serial No. 372,695

3 Claims. (Cl. 250—36)

The present invention relates to electronic circuits and more particularly to a circuit for obtaining a lower frequency of pulses from an input signal having a high pulse frequency.

One of the objects of the present invention is to provide a novel and low cost circuit adapted to be connected so as to receive pulses at a comparatively high frequency and to produce pulses at a rate which is a direct submultiple of the input frequency.

Yet another object is to provide a novel pulse circuit adapted to be actuated by an input pulse, such that the output pulse frequency is a known submultiple of the input pulse frequency and in which the output pulse will always be at or below a certain predetermined frequency, but not less than one-half the certain frequency regardless of the frequency of the input pulse.

An additional object is to produce a novel pulse circuit the output frequency of which is equal to the reciprocal of a time constant in the circuit if this reciprocal is an even submultiple of the input frequency.

Still another object is to provide a novel pulse circuit in which the output pulse frequency is the input frequency divided by the next larger whole number product obtained by multiplying the input frequency by a time constant in the circuit in the event that the reciprocal of this time constant is not an even submultiple of the input frequency.

In many electronic applications it is desirable to produce a relatively low frequency pulse from an already established high frequency pulse source on such a basis that the low frequency pulse is a known submultiple of the high frequency pulse. Sometimes also it is useful to have the output pulse within a certain known limited frequency range. As will be explained in greater detail presently, this is accomplished in the present circuit by providing a gate circuit which will permit a pulse to pass therethrough, and then act a a gate, to prevent successive pulses from following the first until the gating circuit is reconditioned for the passage of another pulse by the operation of a timing circuit. In addition to supplying outpult pulses at a lower frequency than the input pulses, the pulses are amplified.

Referring now to the single figure of the drawings, which comprises a circuit diagram illustrative of one form of the present invention, it is assumed that there is an input pulse circuit connected to the terminal $E_1$ and that there are suitable cathode heaters and circuits therefor. It is assumed also that there is a suitable power supply for connection to the B+ terminal.

The terminal $E_1$ is connected through a capacitor 10 to the first grid 12 of a pentode tube indicated generally by the numeral 14. The grid 12 is also grounded through a resistor 16. The cathode 18 of the tube 12 is grounded while the plate 20 thereof is connected to the B+ terminal through a resistor 22. The plate 20 is also connected to the pulse output terminal at $E_o$ through a capacitor 24 and by way of a capacitor 26 to a lead 28 which extends to the timing circuit indicated generally by the numeral 30. The second grid 32 of the pentode gate tube 14 is connected to ground through a capacitor 34 and by way of a resistor 36 to the B+ terminal. The third grid 38 of the pentode 14 is connected through a capacitor 40 to the lead 28 previously mentioned as extending to the timing circuit.

The timing circuit in the present embodiment of the invention consists of a pair of triode tubes 42 and 44 connected to form a "one shot" multivibrator. In this circuit the plates 46 and 48, respectively, of the two tubes are connected to the B+ terminal through resistors 50 and 52, respectively. The cathodes 54 and 56, respectively, are connected together and to ground through a resistor 58. The grid 60 of the first tube 42 is connected to ground through a resistor 62 whereas the grid 64 of the second tube 44 is connected to the plate 46 of the first tube through a capacitor 66. A voltage divider 67 illustrated in the present example as being comprised of fixed resistor elements 68 and 70 connected to the opposite ends of a variable potentiometer 72, is connected between the B+ terminal and ground, and the slider 74 of the potentiometer 72 at the center is connected to the grid 64 of the second tube 44 through an additional fixed resistor 76.

In the portion of the circuit indicated generally at 30, that is, the one shot multivibrator, the connection of the grid of the first tube 42 to ground through the grid leak resistor 62 while returning the grid 64 of the second tube 44 to the B+ supply results in a quiescent condition being reached with tube 44 carrying a comparatively large plate current because of the positive grid 64. The cathodes 54 and 56 are therefore considerably positive with respect to ground. This causes tube 42 to be cut off at the B+ voltage applied to its plate 46.

If now a positive pulse is applied at the terminal $E_1$, this pulse appears as an amplified negative pulse at the plate 20 and at the output terminal $E_o$. This negative pulse also is applied to the grid 64 by way of capacitors 26 and 66 and cuts off tube 44, thereby initiating multivibrator action in which the plate current is transferred to tube 42 because of the cathode coupling between tubes 42 and 44. This condition prevails until the charge on the condenser 66 is able to leak off through resistors 76, 68 and the top portion of 72. When the negative voltage upon the grid 64 has been reduced to approximately the original level, tube 44 can again conduct and the plate current switches back to tube 44 thereby restoring the original quiescent condition.

The strong negative pulse which appears at plate 46 upon the initiation of multivibrator action is conducted back through the lead 28 and capacitor 40 and is applied to the third grid 38 of the pentode gate tube 14. This cuts off the pentode so that additional pulses arriving at the terminal $E_1$ will not appear at the plate 20 until the negative potential in the line 28 has been dissipated.

From the above it is apparent that although the first pulse applied to the terminal $E_1$ is amplified and appears at the terminal $E_o$ as a negative pulse, successive pulses arriving at the terminal $E_1$ will not appear at the terminal $E_o$ until the pulse in lead 28 has decayed. The period of cutoff of the tube 14, therefore, is dependent upon the length of time the lead 28 is energized from the multivibrator timing circuit, and this is determined principally by the time constant of the RC circuit made up of the capacitor 66 and the resistors in the circuit between B+ and the grid 64. By moving the slider 74, the resistance in this circuit can be adjusted to give a selected time constant for the purpose at hand. Therefore, whatever the time constant of this RC circuit, the output frequency will be the reciprocal of the time constant if this is an even submultiple of the input frequency. Otherwise it will be the input frequency divided by the next larger whole number product obtained by multiplying the input frequency by the time constant. For instance, if the time constant is 1/1000 of a second and the input pulse frequency is 3000 per second, then every third pulse will appear at $E_o$ and the output frequency will be 1000 per second. On the other hand, if the input frequency is 3,500, then every fourth pulse will appear at $E_o$ to give an output frequency of 875. In applying the above formula to the last example it will be seen that when 3500 is multiplied by the time constant (1/1000) the product, 3½, is not an integer and therefore the next higher whole number, 4, is selected. 3500 divided by 4 is 875 or the output frequency.

From the above it is apparent that the lowest output pulse frequency will be obtained when the input frequency is just a little greater than the reciprocal of the time constant. In other words, if the input frequency is 1001 and the time constant is 1/1000, every other pulse will arrive at the terminal $E_o$. The output frequency, therefore, is 500½. The output frequency, therefore, regardless of the input frequency, will never be greater than the reciprocal of the time constant and will never be less than one-half this amount.

From the above description of a preferred embodiment of my invention it will be appreciated that variations and modifications may be made therein without departing from the scope of the invention. The invention therefore is to be measured by the scope of the following claims.

Having described my invention, what I claim as new and useful and desire to secure by Letters Patent is:

1. In a pulse frequency dividing system, an input terminal to accept an incoming pulse, an amplifier tube and associated circuit connected to said terminal to amplify a pulse applied to said input terminal, an output terminal for said system connected to receive said amplified pulse from said amplifier tube, a timing circuit connected to be triggered by said amplified pulse, said timing circuit being adapted to supply a negatve potential for a predetermined time interval after being triggered, and circuit means for imposing said negative potential on said amplifier tube to cut off the current therethrough for the duration of said interval.

2. In a pulse frequency dividing circuit, an input terminal to accept an incoming pulse, a pentode amplifier tube having one grid thereof connected to said terminal to amplify a pulse applied to said input terminal, an output terminal connected to receive said amplified pulse, a timing circuit connected to be triggered by said amplified pulse, said timing circuit being adapted to supply a negative potential for a predetermined time interval after being triggered, and circuit means for imposing said negative potential upon a second grid of said amplifier tube to cut off the current therethrough for the duration of said interval.

3. In a pulse frequency dividing circuit, an input terminal to accept an incoming pulse, a pentode amplifier tube having one grid thereof connected to said terminal to amplify a pulse applied to said input terminal, an output terminal connected to receive said amplified pulse, circuit means forming a one shot multivibrator connected to be triggered by said amplified pulse, said multivibrator being adapted to supply a negative potential for a predetermined time interval after being triggered, and circuit means for imposing said negative potential upon a second grid of said amplifier tube to cut off the current therethrough for the duration of said interval.

References Cited in the file of this patent

UNITED STATES PATENTS

| | | |
|---|---|---|
| 2,158,285 | Koch | May 16, 1939 |
| 2,365,583 | Nagel et al. | Dec. 19, 1944 |